Dec. 20, 1938.                    R. R. EMERY                    2,140,870
              CONCEALED GUN CARRIER FOR MOTOR VEHICLES
                Filed July 20, 1937          2 Sheets-Sheet 1
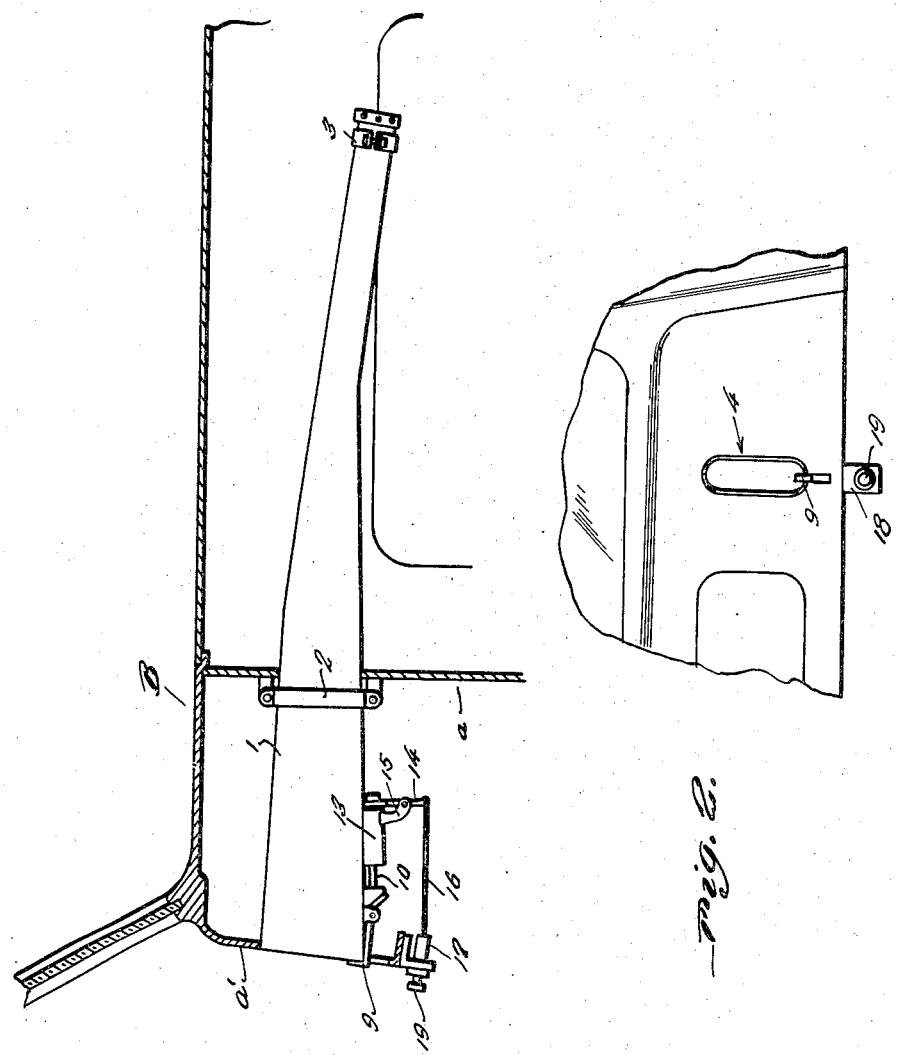
Inventor
R. R. Emery
By Clarence A. O'Brien
Hyman Berman
Attorneys Dec. 20, 1938.　　　　R. R. EMERY　　　　2,140,870
CONCEALED GUN CARRIER FOR MOTOR VEHICLES
Filed July 20, 1937　　　　2 Sheets-Sheet 2
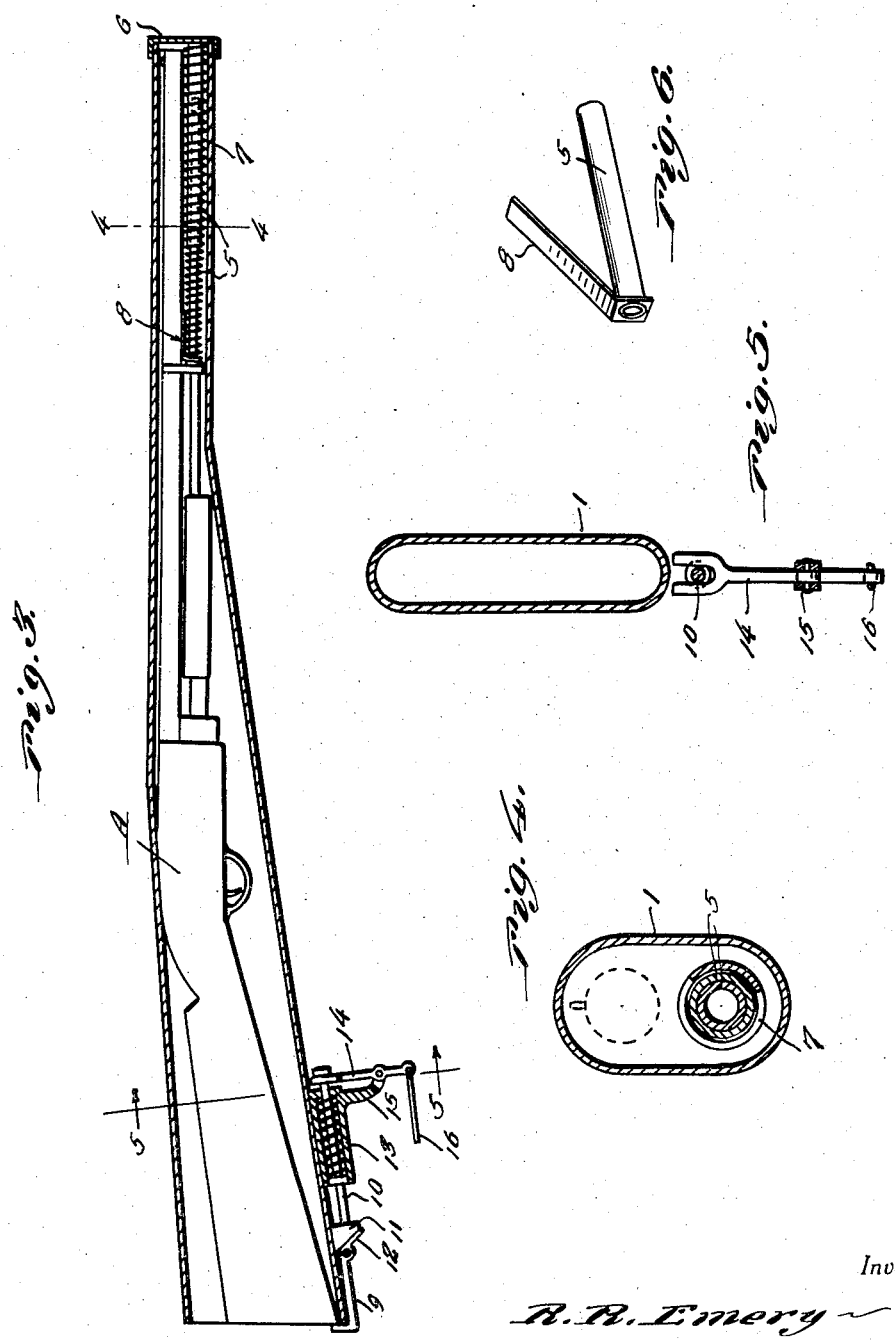
Inventor
*R. R. Emery*
By *Clarence A. O'Brien*
*Hyman Berman*
Attorneys Patented Dec. 20, 1938

2,140,870

UNITED STATES PATENT OFFICE 2,140,870

CONCEALED GUN CARRIER FOR MOTOR VEHICLES

Rolla R. Emery, Kansas City, Mo.

Application July 20, 1937, Serial No. 154,655

1 Claim. (Cl. 224—2)

This invention relates to a gun carrier for motor vehicles, the general object of the invention being to provide a casing for holding a gun in concealed position in an automobile with means operated by the occupant of the automobile for causing the gun to be delivered from the carrier where it can be quickly seized and aimed by the operator.

This invention also consists in certain other features of construction and in the combination and arrangement of several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a fragmentary sectional view through an automobile showing the invention applied thereto.

Figure 2 is a fragmentary view of the instrument board of the automobile with the invention in place.

Figure 3 is a longitudinal sectional view through the device with the gun therein.

Figure 4 is a section on the line 4—4 of Figure 3.

Figure 5 is a section on the line 5—5 of Figure 3.

Figure 6 is a detail view showing a portion of one of the telescopic spring supporting rods and the spring guide.

In these drawings the numeral 1 indicates a casing made somewhat in the shape of a gun so that a gun, such as shown at A can be placed therein, the casing being preferably made to suit the particular type of gun with which it is to be used. An intermediate part of the casing passes through an opening in the dash $a$ of the automobile B and a supporting member 2 is fastened to the dash and engages said part of the casing. A clamp 3 engages the front and small end of the casing and is suitably supported from the cross bars or other parts of the automobile adjacent the center of the hood and, of course, under the hood. The large rear end of the casing is located in an opening 4 in the instrument board $a'$ or this end of the casing may be located in a small compartment usually constructed with the instrument board so that the door of this compartment will hide the rear end of the casing from view when the door is closed. Of course, the location of this end of the casing is left to the preference of the user and it is also controlled by the type of automobile on which the invention is used. Telescoped members 5 are located in the front end of the casing with the front end of one member fastened to the front end or cap 6 of the casing. A spring 7 is mounted on these members and tends to force the rear member 5 rearwardly against a part of the gun so as to project the gun from the casing. A leaf spring 8 has one end fastened to the rear end of the rear member 5 and said spring slopes upwardly and forwardly as shown in Figure 6, and acts as a guide for the barrel of the gun when the gun is being put in the casing, so as to cause the barrel to enter the space between the telescopic members and the top of the casing. The spring 8 is forced downwardly by the barrel as the barrel moves into position, as shown in Figure 3.

A latch 9 is pivoted to the under part of the rear end of the casing and engages the butt of the gun to hold the same in the casing, as shown in Figure 3. A spring pressed rod 10 has a cam head 11 for engaging the angle part 12 of the latch to hold the latch in engaging position. The rod passes through a cylinder 13 in which the spring is located and a lever 14 pivoted to a bracket 15 on the cylinder has one end forked to engage the head at the rear end of the rod 10. A link 16 is connected to the lower end of the lever and passes through a guide 17 carried by brackets 18 on the instrument board, a button or headed member 19 being connected to the rear end of the link. Thus by pulling upon the member 19 the link will rock the lever 14 which retracts the rod 10 so that the head 11 moves out of engagement with the angle part 12 of the latch 9 thus permitting the latch to drop by gravity or to yield under the pressure exerted by the gun under the action of the spring 7. This spring 7 is strong enough to throw the gun into the lap or adjacent the person of an operator in the vehicle so that said operator can seize and aim the gun with the least possible delay.

If the rear end of the casing is placed in the small compartment, as suggested above, then the door should be such that it can be kicked open by the gun as the same is thrown out of the casing by the spring 7.

It is thought from the foregoing description that the advantages and novel features of the invention will be readily apparent.

It is to be understood that changes may be made in the construction and in the combination and arrangement of the several parts, provided that such changes fall within the scope of the appended claim.

Having described the invention what is claimed as new is:

Means for supporting a gun in a motor vehicle comprising a casing supported in the vehicle with its rear end opening out through a part of the instrument board of the vehicle, said casing having a reduced front end for receiving the front portion of the barrel of a gun and said casing being shaped to support the gun by the internal walls of the casing, a pair of telescoping members in the lower portion of the front end of the casing, one member having its front end connected with the front end of the casing and the other member having its rear end engaging a part forming a portion of the gun, a spring encircling the telescopic members and tending to move the rear member rearwardly and to throw the gun from the casing and a leaf spring having one end connected with the rear end of the rear telescoping member and the rest of the spring extending upwardly and forwardly to engage a part of the gun barrel and to guide said barrel into the front end of the casing above the telescoping members, latch means for holding the gun in the casing and manually operated means on the instrument board for releasing the latch means.

ROLLA R. EMERY.